July 28, 1936. S. C. FULTON ET AL 2,049,055
METHOD FOR PREPARING IMPROVED SOAPS AND PRODUCTS THEREOF
Filed April 28, 1934
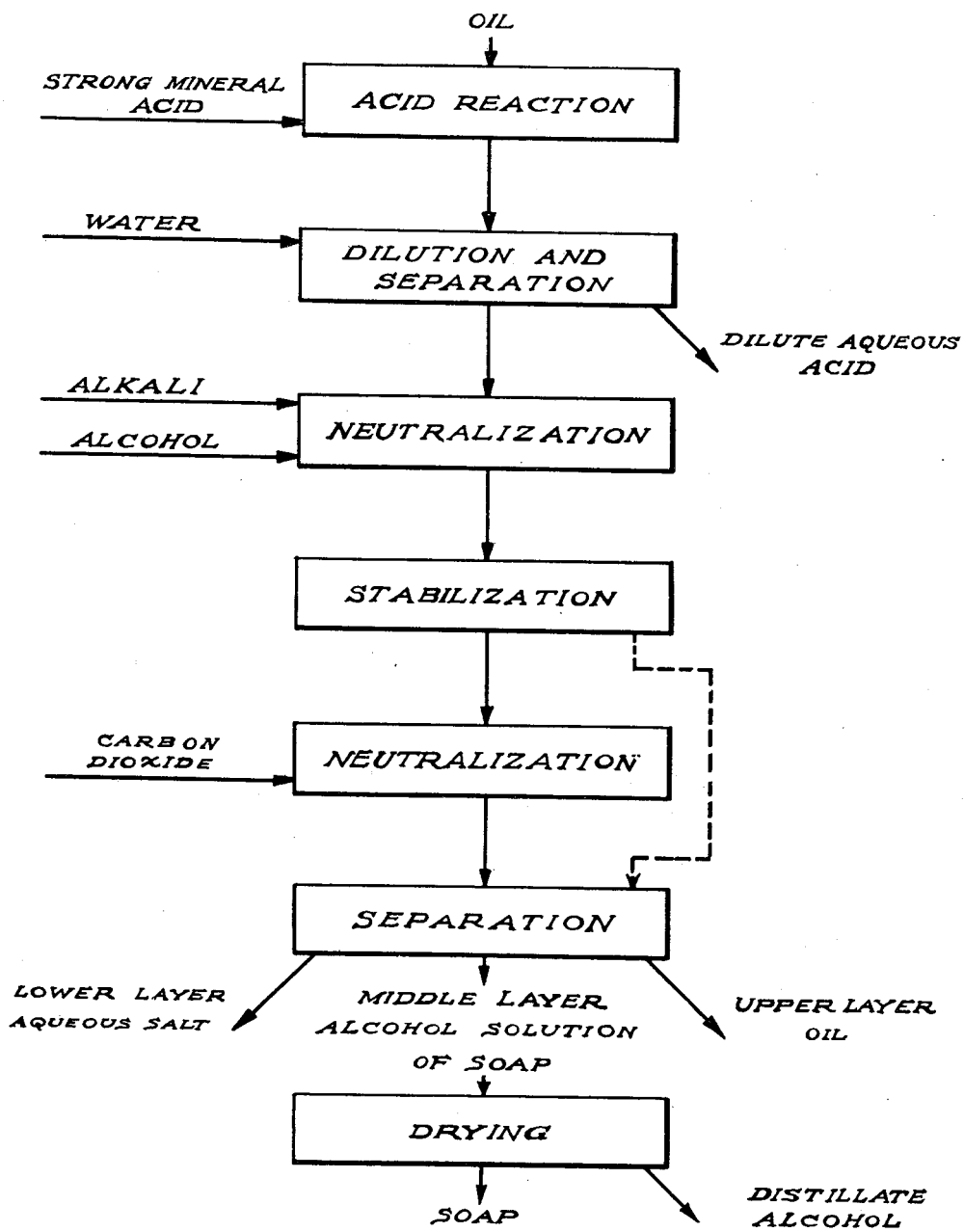

Patented July 28, 1936

2,049,055

UNITED STATES PATENT OFFICE 2,049,055

METHOD FOR PREPARING IMPROVED SOAPS AND PRODUCTS THEREOF

Stewart C. Fulton and Hans G. Vesterdal, Elizabeth, N. J., assignors to Standard Oil Development Company, a corporation of Delaware Application April 28, 1934, Serial No. 722,838

14 Claims. (Cl. 260—99.12)

This invention relates to methods for preparing improved soaps and to the products so obtained and, more particularly, to methods for preparing a stable soap from unstable organic derivatives of strong mineral acids and from soap compositions containing such derivatives.

It has been observed that soaps obtained by neutralizing with an alkali the reaction products of acid reactive hydrocarbon oils with strong mineral acids are unstable and gradually become acid when in aqueous solutions, even at room temperature. This acidity is apparently due to the development of mineral acid, and is a serious drawback for only a slight change in pH of the soap solution is sufficient to have a marked effect on cotton by reducing its tensile strength. An object of this invention is to subject such unstable soaps to a treatment which will increase their stability and produce improved soaps showing greatly decreased development and even no appreciable development whatever of acidity under conditions ordinarily used for washing textiles. Other and further objects of this invention will be apparent from the following description and the claims.

It has been found that such unstable soaps which tend to develop acidity in aqueous solution may be rendered more stable by a preliminary partial hydrolysis. It has been found that the unstable components of the soap may be hydrolyzed much more readily than the preferred components of the soap, so that the former may be substantially completely removed, leaving an improved product of much greater utility for wetting, cleansing and laundering purposes generally. The conditions of hydrolysis selected are preferably such as to not materially affect the desirable components of the soap which are normally present in much greater proportion than the unstable compounds. For example, unstable sodium soaps of the reaction product of acid reactive hydrocarbon oils with fuming sulfuric acid at low temperatures may be made much more stable, by boiling an aqueous solution thereof containing about 1 to 2% of a hydrolyzing agent, such as a free alkali, under reflux for 4 to 6 or 8 hours. The time may be considerably shortened by heating from 110° C. to 150° C. under pressure.

The following example illustrates one suitable method for producing a stable soap according to the present invention. This example will be described in connection with the drawing which shows in diagrammatic form a suitable flow plan for the process.

A fraction of cracked petrolatum distilling between 360 and 600° F. is obtained by the destructive distillation of petrolatum at atmospheric pressure while refluxing and redistilling the heavier uncracked vapor. 36 litres of this distillate containing about 35% of olefins are treated at about 12 to 20° F. with 7 kg. of fuming sulfuric acid containing 20% sulfuric anhydride, by slow addition of acid with cooling and vigorous agitation during about three hours. The reaction mixture is then carefully diluted by addition of ice or cold water with continued agitation and cooling to maintain the temperature below about 20° F., until the sulfuric acid strength is below about 60%. The mixture is then allowed to stand whereupon aqueous sulfuric acid separates as a bottom layer and is separately withdrawn.

The upper layers comprising unreacted oil and sulfuric acid derivatives are neutralized with a suitable alkali, such as sodium carbonate or sodium hydroxide, which is added in sufficient amount to provide an excess of about 1 to 2% of free alkali in the final mixture. 18 litres of isopropyl alcohol are added during the neutralization to prevent the separation or jelling of the soaps formed. The mixture is then subjected to a hydrolysis treatment in which it is heated to boiling under reflux for eight hours. It is then cooled to about room temperature and carbon dioxide is forced through the liquid to convert any free alkali present to the carbonate. The mixture is then allowed to stand, whereupon it separates into a lower aqueous layer containing inorganic salts, such as sodium sulfate and sodium carbonate, a middle layer of alcohol containing the soaps in solution and an upper layer of oil. The three layers are separately withdrawn. Any soap present in the oil layer may be extracted therefrom with 50% aqueous isopropyl alcohol and the extract added to the middle layer. The alcohol solution is then evaporated to dryness on a drum dryer at a temperature of about 120° C. There are thus obtained 4.5 kg. of soap. This soap is of a very light amber color and gives practically colorless aqueous solutions in concentrations suitable for washing and laundering purposes, say 0.2 to 0.5%. This soap is a highly effective detergent and wetting agent and is effective in both soft and hard water, and even in sea water.

Moreover, this soap is substantially neutral, a 5% aqueous solution having an initial pH of 6.6 and showing no increase in acidity on boiling under reflux for ten hours or on standing at room temperature for two weeks. A soap produced by the same process described above, but omitting the hydrolysis step, also shows an initial pH of 6.6 in a 5% aqueous solution. This latter soap, however, develops acidity rapidly. On heating to a boiling temperature its pH drops immediately to below 3, while on standing at room temperature its pH is below 3.8 in two weeks.

The stability of the soap varies with the extent of hydrolysis. For example, if the soap is boiled under reflux for four hours in the above example, a finished soap is obtained which develops a pH of 3.8 on four hours additional boiling under reflux of a 5% aqueous solution. If the initial hydrolysis is conducted for six hours, the finished soap develops a pH of 5.4 in the four hour boiling test. The time of hydrolysis required to produce a stable soap may be shortened by the use of pressures above atmospheric, permitting the hydrolysis to be conducted at higher temperatures. For example, the time may be considerably shortened by heating to about 220 to 500° F. under sufficient pressure to maintain the aqueous solution in liquid phase, heating for about one half hour or less at 300° F. being sufficient to obtain a stable stage. A correspondingly shorter time of heating may be used at higher temperatures, as little as 5 minutes heating at 500° F. being sufficient to cause a marked increase in the stability of the soap.

In case the soap has not been subjected to the hydrolysis stage sufficiently long to render it completely stable, or if for any other reasons it develops acidity during the drying operation, the purity and yield of the dried soap may be increased by maintaining a slight excess of a suitable base, preferably a volatile base such as ammonia, in the soap composition during the drying operation. This method of preventing deterioration during drying is described and claimed in copending application Serial No. 704,790, filed December 30, 1933, by Hans G. Vesterdal.

Various alternatives in the above described process are readily apparent to one skilled in the art and it is to be understood that this invention is not to be limited to any definite consecutive order for the steps shown; for example, the three-layer separation of aqueous salts, alcoholic soaps and oil may be conducted before the hydrolysis. In such case, the separated oil may be extracted with an aqueous alcohol or other suitable solvent to remove sulfuric acid derivatives, which may be added to the alcohol layer before the hydrolysis. Various other methods may be used for separating the soaps from the reaction products at any stage before or after the hydrolysis. The hydrolysis or stabilization step may be omitted during the process of preparing the soaps, which may be separated from the alcohol and then stabilized by refluxing with added water and a small amount of a suitable hydrolyzing agent.

While not intending to limit this invention in any way whatsoever, it is suggested that the instability of soaps of the type shown above is due to the presence of di-alkyl sulfates which may be hydrolyzed into an acidic compound and an alcohol. In confirming this, alcohols of about $C_{10}$ to $C_{16}$ carbon atoms have been isolated from the oil layer after hydrolysis. These alcohols may be used to prepare additional quantities of valuable soaps by reaction with sulfuric acid or other strong mineral acids, for example, the oil layer, separated after the hydrolysis step in the above example, may be recyled to the acid reaction or may be treated separately with strong or fuming sulfuric acid under suitable conditions to produce sulfuric acid derivatives of the alcohols. Since the recirculation of this oil layer to the acid reaction would involve a continued increase of oil in the system, it is preferred to remove the alcohols from the oil by any suitable means, as by reaction with sulfuric acid, for example, under the same conditions used for the initial acid reaction. The extracted alcohols may be returned to the initial acid reaction step. If, on the other hand, sulfuric acid derivatives of these alcohols are used to separate them from the oil, the derivatives may be separately worked up into soap, or may be added to the main process at any suitable step, preferably before the hydrolysis step.

The preparation of a soap of a strong mineral acid derivative of cracked petrolatum, described in the above example, is not a part of this invention, but is claimed in the copending application Serial No. 704,749, filed December 30, 1933, by William J. Sweeney. Other soaps which may be improved and rendered more stable by the herein described invention are the soaps of sulfuric acid derivatives of other cracked paraffins, such as cracked normally solid paraffin wax. The preferred soaps contain organic groups containing more than 7 carbon atoms, probably connected in a straight chain and connected with the sulfuric groups by a carbon atom at or near the end of the chain. The reactive hydrocarbon oils are preferably obtained by cracking paraffin under conditions avoiding substantial polymerization. Still other soaps which may be similarly improved are those obtained by treating acid reactive hydrocarbon oils such as white oil stocks with strong mineral acids, such as sulfuric acid or fuming sulfuric acid, under conditions avoiding polymerization, charring and the formation of pitch like sludge and neutralizing the resulting acid derivates with a soap forming base, such as an alkali, ammonia or other base capable of forming water soluble soaps.

A preferred method for preparing such soaps of superior quality, in which the reaction of acid and oil is conducted at a low temperature, preferably below 0 to 20° F., and the concentration of free sulfuric acid in the reaction mixture is then reduced, by dilution or neutralization, to below about 50 to 60% without rise in temperature of the mixture above about 20° F. is described and claimed in a copending application of the present inventors filed on the same date as this invention.

This invention is not to be limited by any theoretical explanations or examples which are presented herein solely for the purpose of illustration, but is limited only by the following claims, in which it is desired to claim all novelty insofar as the prior art permits.

We claim:

1. Process for preparing an improved soap comprising treating an olefin of more than about 7 carbon atoms with fuming sulfuric acid at a reaction temperature below 40° F., reducing the acid strength to below about 60% while maintaining the mixture below about 40° F., removing the free acid from the reaction mixture, adding an excess of aqueous alkali, heating the alkaline mixture to hydrolyze unstable bodies therein, then separating therefrom a stable soap.

2. Process according to claim 1 in which the said heating step is conducted under reflux for about eight hours.

3. Process according to claim 1 in which the said heating step is conducted under pressure for about 5 to 30 minutes at a temperature substantially above 212° F. and below 500° F.

4. Process according to claim 1 in which an excess of about 1 to 2% of a free alkali is maintained in the aqueous phase during said heating.

5. Process according to claim 1 in which the heated mixture is cooled and is caused to separate into layers by the addition of a water soluble alcohol, separately withdrawing the resulting alcoholic solution of soap, neutralizing said solution with carbon dioxide and removing the water and alcohol therefrom to produce a stable soap.

6. Process according to claim 1 in which the olefin comprises a mixture obtained by cracking a paraffin.

7. Process according to claim 1 in which the olefin comprises a mixture of hydrocarbons obtained by cracking a normally solid paraffin under conditions avoiding polymerization.

8. Process for preparing an improved soap from a soap containing a mixture of strong sulphuric acid derivatives of olefinic hydrocarbons of more than 7 carbon atoms, which soap develops acidity in aqueous solution, comprising subjecting said soap to hydrolysis under conditions sufficient to hydrolyze the unstable components thereof and recovering a stable soap.

9. Process according to claim 8 in which said hydrolysis includes refluxing an aqueous solution of the soap containing about 1 to 2% of a hydrolyzing agent.

10. Process according to claim 8 in which said hydrolysis includes refluxing an aqueous solution of said soap containing an excess of free alkali for more than about 4 hours.

11. Process for preparing an improved soap comprising treating an olefine of more than about seven carbon atoms with an excess of fuming sulfuric acid at a temperature below about 40° F., reducing the strength of residual free acid to below about 60%, while maintaining the reaction mixture at a temperature below about 40° F., removing free acid from the reaction mixture, neutralizing the reaction mixture with an alkali, hydrolyzing di-alkyl sulphates therein in the presence of excess aqueous alkali, reacting the resulting alcohols with additional sulfuric acid and neutralizing the resulting alkyl sulphates to form additional soaps.

12. Process according to claim 11 in which the product of the said hydrolysis is neutralized with carbon dioxide and a stable soap is separated therefrom.

13. Process according to claim 11 in which the soap is extracted from the product of said hydrolysis with a selective solvent and the remaining olefine is treated with fuming sulfuric acid to produce additional soap.

14. Process for preparing an improved detergent comprising reacting an olefine of eight or more carbon atoms with fuming sulfuric acid at temperatures between about −10° F. and about 40° F. to form a mixture of acid alkyl sulfates and dialkyl sulfates, decomposing the said dialkyl sulfates by alkaline hydrolysis and separating therefrom a stable neutralized acid alkyl sulfate.

STEWART C. FULTON.
HANS G. VESTERDAL.